(12) United States Patent
Gogic

(10) Patent No.: US 9,173,148 B2
(45) Date of Patent: Oct. 27, 2015

(54) IDENTIFICATION OF TARGET NODE FOR WIRELESS HANDOFF

(75) Inventor: Aleksandar M. Gogic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1127 days.

(21) Appl. No.: 12/247,633

(22) Filed: Oct. 8, 2008

(65) Prior Publication Data

US 2009/0097451 A1   Apr. 16, 2009

Related U.S. Application Data

(60) Provisional application No. 60/979,801, filed on Oct. 12, 2007.

(51) Int. Cl.
| | | |
|---|---|---|
| *H04W 4/00* | (2009.01) | |
| *H04W 36/30* | (2009.01) | |
| *H04W 36/24* | (2009.01) | |
| *H04W 36/12* | (2009.01) | |
| *H04W 36/32* | (2009.01) | |

(52) U.S. Cl.
CPC .............. *H04W 36/30* (2013.01); *H04W 36/24* (2013.01); *H04W 36/12* (2013.01); *H04W 36/32* (2013.01)

(58) Field of Classification Search
USPC ........................... 370/331, 328; 455/444, 436
See application file for complete search history.

(56) References Cited

U.S. PATENT DOCUMENTS

| | | | |
|---|---|---|---|
| 6,108,548 A * | 8/2000 | Furukawa et al. ............ 455/442 |
| 6,748,215 B1 | 6/2004 | Chen et al. | |
| 6,826,402 B1 * | 11/2004 | Tran ............................. 455/438 |
| 7,065,361 B1 * | 6/2006 | Fortuna ........................ 455/438 |
| 7,542,765 B2 | 6/2009 | Kwun et al. | |
| 8,379,512 B2 | 2/2013 | Gogic et al. | |
| 2002/0122396 A1 | 9/2002 | Terasawa | |
| 2007/0019586 A1 | 1/2007 | Nanda et al. | |
| 2007/0021126 A1 | 1/2007 | Nanda et al. | |
| 2007/0105568 A1 | 5/2007 | Nylander et al. | |

(Continued)

FOREIGN PATENT DOCUMENTS

| | | |
|---|---|---|
| CN | 1852558 A | 10/2006 |
| CN | 1949922 A | 4/2007 |

(Continued)

OTHER PUBLICATIONS

International Search Report & Written Opinion—PCT/US2009/079320, International Search Authority—European Patent Office—Mar. 9, 2009.

(Continued)

*Primary Examiner* — Kodzovi Acolatse
(74) *Attorney, Agent, or Firm* — Fariba Yadegar-Bandari

(57) ABSTRACT

Identification of an access point to which an access terminal is to be handed-off involves, in some aspects, identifying one access point of a set of access points that may have been detected by an access terminal. For example, an access terminal may receive a signal having an identified characteristic (e.g., a particular phase offset) from an access point. Each access point of a set of access points associated with the identified characteristic may be directed to attempt to decode a signal from the access terminal. The access point of the candidate set to use for the handoff operation may then be determined based on the signal received from the access terminal, if any, by each of the candidate access points.

57 Claims, 9 Drawing Sheets

(56) References Cited

U.S. PATENT DOCUMENTS

| | | |
|---|---|---|
| 2007/0213067 A1* | 9/2007 | Li et al. .................. 455/444 |
| 2007/0213086 A1 | 9/2007 | Claussen et al. |
| 2008/0101301 A1* | 5/2008 | Thomas et al. ............ 370/335 |
| 2008/0305801 A1* | 12/2008 | Burgess et al. ............ 455/444 |
| 2009/0097452 A1 | 4/2009 | Gogic |
| 2009/0098871 A1 | 4/2009 | Gogic |
| 2009/0098873 A1 | 4/2009 | Gogic |
| 2010/0069072 A1 | 3/2010 | Gogic et al. |
| 2013/0148632 A1 | 6/2013 | Gogic et al. |
| 2013/0150046 A1 | 6/2013 | Gogic et al. |

FOREIGN PATENT DOCUMENTS

| | | |
|---|---|---|
| EP | 1056219 A2 | 11/2000 |
| EP | 1732269 A1 | 12/2006 |
| JP | 2000341193 A | 12/2000 |
| JP | 2010512116 A | 4/2010 |
| JP | 2010531124 A | 9/2010 |
| KR | 20060128542 A | 12/2006 |
| WO | 0228122 A2 | 4/2002 |
| WO | WO2007010304 | 1/2007 |
| WO | WO-2007015068 A1 | 2/2007 |
| WO | WO2007103062 A1 | 9/2007 |
| WO | WO-2008088521 A1 | 7/2008 |
| WO | WO-2008157817 A1 | 12/2008 |

OTHER PUBLICATIONS

Taiwan Search Report—TW097139027—TIPO—Feb. 22, 2012.

Huawei: "Multiple preparations of eNBs" 3GPP Draft; R3-071943 Multiple Preparations of ENBS, 3rd Generation Partnership Project (3GPP), Mobile Competence Centre; 650, Route Des Lucioles; F-06921 Sophia-Antipolis Cedex; France, vol. RAN WG3, no.Sophia Antipolis,France; Oct. 3, 2007, XP050162730 [retrieved on Oct. 3, 2007].

Vodafone, "GERAN to LTE Handover: Home Cell Deployment Considerations", 3GPP Workshop GERAN/RAN, TDoc GR-070020, Sep. 28, 2007.

European Search Report—EP13187858—Search Authority—Munich—Jan. 8, 2014.

3GPP2 C.S0005-0, Upper Layer (Layer 3) Signaling Standard for cdma2000 Spread Spectrum Systems, Release 0, Version 3.0, Jun. 15, 2000, Section 2.7.2.3.2.5, pp. 2-428 to 2-429.

* cited by examiner

IDENTIFICATION OF TARGET NODE FOR WIRELESS HANDOFF

CLAIM OF PRIORITY UNDER 35 U.S.C. §119

This application claims the benefit of and priority to commonly owned U.S. Provisional Patent Application No. 60/979,801, filed Oct. 12, 2007, the disclosure of which is hereby incorporated by reference herein.

BACKGROUND

1. Field

This application relates generally to wireless communication and more specifically, but not exclusively, to improving communication performance.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations such as macro base stations, small-coverage base stations may be deployed (e.g., installed in a user's home) to provide more robust indoor wireless coverage for mobile units. Such small-coverage base stations are generally known as access point base stations, Home NodeBs, or femto cells. Typically, such small-coverage base stations are connected to the Internet and the mobile operator's network via a DSL router or a cable modem.

As a mobile unit moves throughout a given geographical area, the mobile unit may need to be handed-off from one of the base stations of the wireless communication system to another base station. In such a system, small-coverage base stations may be deployed in an ad-hoc manner. For example, small-coverage base stations may be deployed based on the individual decision of owners that install the base stations. Thus, in a given area there may be a relatively large number of these small-coverage base stations to which the mobile unit may be handed-off. Consequently, there is a need for effective handoff methods in a wireless communication system employing a large number of base stations.

SUMMARY

A summary of sample aspects of the disclosure follows. It should be understood that any reference to the term aspects herein may refer to one or more aspects of the disclosure.

The disclosure relates in some aspect to identifying an access point to which an access terminal is to be handed-off. For example, when an access terminal detects a signal from an access point, there may be ambiguity as to the identity of the access point. In such a case, identifying an access point to which the access terminal is to be handed-off may involve determining which access point of a set of access points in a given area transmitted the signal detected by the access terminal.

The disclosure relates in some aspect to identifying a set of candidate access points for a handoff operation. For example, a network node may receive a message from an access terminal that indicates that the access terminal received a signal having an identified characteristic (e.g., a particular phase offset). In such a case, the network node may define a set of candidate access points by determining which access points in the vicinity of the access terminal generate signals having the identified characteristic.

The disclosure relates in some aspect to identifying an access point for a handoff operation based on a signal received at the access point. For example, each access point of a candidate set of access points may be instructed to attempt to detect a signal from the access terminal and send a report to the network node indicative of the signal received from the access point, if any. The network node may then determine which access point of the candidate set to use for the handoff operation. For example, the access point that received the signal from the access terminal at the highest signal strength may be selected as the target access point for handoff.

In some aspects the access points of the candidate set may comprise femto nodes that have smaller coverage areas than the coverage area provided by a macro access point. In some aspects, these access points may be deployed in an ad hoc manner.

BRIEF DESCRIPTION OF THE DRAWINGS

These and other sample aspects of the disclosure will be described in the detailed description and the appended claims that follow, and in the accompanying drawings, wherein:

Figure 1:
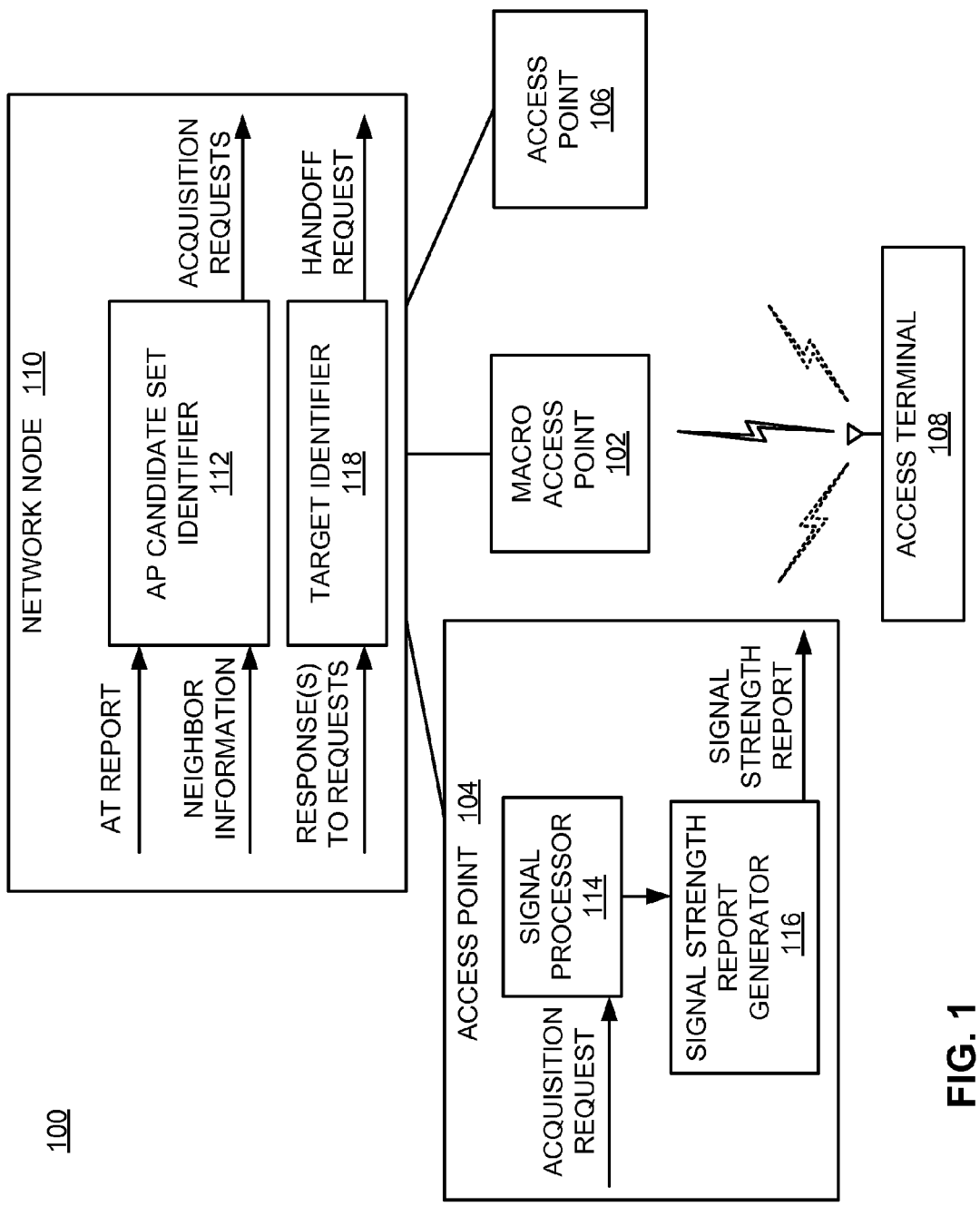
FIG. 1 is a simplified block diagram of several sample aspects of a communication system configured to perform handoff operations in accordance with the teachings herein.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more network nodes, access points, and access terminals that communicate with one another. It should be appreciated, however, that the teachings herein may be applicable to other types of apparatuses or other similar apparatuses that are referenced using other terminology.

Access points 102, 104, and 106 in the system 100 provide one or more services (e.g., network connectivity) for one or more wireless terminals (e.g., access terminal 108) that may be installed within or that may roam throughout an associated geographical area. In addition, the access points 102-106 may communicate with one or more network nodes (represented, for convenience, by network node 110) to facilitate wide area network connectivity. Such network nodes may take various forms such as, for example, one or more radio and/or core network entities (e.g., a mobility manager such as a base station controller, a mobility management entity, a radio network controller, etc.).

When the access terminal 108 is in a connected state (e.g., during an active call) the access terminal 108 will be served by one of the access points in the system 100 (e.g., macro access point 102). As the access terminal 108 moves closer to the access point 104, however, the access terminal 108 may receive stronger signals from the access point 104 than from the access point 102. Consequently, it may be desirable to hand-off the access terminal 108 from the access point 102 (e.g., the source access point) to the access point 104 (e.g., the target access point) to maintain the best possible wireless signal quality for the access terminal 108.

In practice, however, the identity of the access point that transmits the signals received by the access terminal 108 may not be readily known. For example, in some scenarios, multiple access points in a given area may transmit using similar parameters whereby signals (e.g., pilots or beacons) transmitted by those access points may not be readily distinguishable.

FIG. 1 and the discussion that follows illustrate a scheme for identifying an access point 104 to which an access terminal 108 may be handed-off. When the access terminal 108 is in the connected state, it may analyze the signals it receives from any nearby signal sources. Here, the access terminal 108 may identify different signals from different sources based on one or more characteristics of the received signals. For example, in some implementations different communication nodes may transmit signals using different phase offsets of a pseudorandom number ("PN") sequence. The access terminal 108 also may measure certain characteristics of each signal such as, for example, received signal strength. The access terminal may report this information to the network node 110 to enable the network node 110 to determine whether the access terminal 108 should be handed-off and/or to facilitate the handoff by coordinating the handoff with the source and target access points.

The network node 110 may cooperate with one or more of the access points in the system 100 to determine the identity of the access point that transmits the signals reported by the access terminal 108. For example, an access point ("AP") candidate set identifier 112 may identify a set of candidate target access points that may be transmitting these signals. As will be discussed in more detail below, the candidate set may be selected by identifying access points in the vicinity of the macro access point 102 (e.g., as indicated by neighbor cell information of all femto access points having macro access point 102 as a neighbor) that transmit signals having the same characteristics (e.g., phase offset) as the signal received by the access terminal 108. Thus, the candidate set identifier 112 may make this determination based on the measurement report information provided by the access terminal 108 and neighbor cell information of the femto cells that is stored in a system configuration database. Once the candidate set is identified, the candidate set identifier 112 may send a request to each of the access points in the candidate set instructing the access points to attempt to acquire an uplink signal from the access terminal 108.

In response to an acquisition request, each access point of the candidate set may attempt to acquire and monitor the uplink signal of the access terminal 108 and report back to the network node 110. For example, upon receipt of an acquisition request a signal processor 114 of the access point 104 may commence searching for the signal from the access terminal 108 on the uplink. In the event an uplink signal is detected, a signal strength report generator 116 may generate a report indicative of the corresponding received signal strength and send the report back to the network node 110. To reduce the complexity of FIG. 1, the components 114 and 116 are only depicted for the access point 104. It should be appreciated, however, that these or similar components may be incorporated into other access points (e.g., access point 106) in the system 100.

A target identifier 118 at the network node 110 processes the responses (e.g., signal strength reports) received from the candidate access points that had reported detection of the uplink signal from the AT 108, to identify the access point that transmitted the signals reported by the access terminal 108. For example, as will be discussed in more detail below, the identified access point may correspond to the access point that reported the highest received signal strength on the uplink from the access terminal 108. Once this access point is identified, the network node 110 may then send the appropriate handoff request messages to initiate handoff of the access terminal 108 from the source access point (e.g., access point 102) to the target access point (e.g., access point 104).

In some aspects a handoff scheme such as this may be employed in a network that includes macro coverage (e.g., a large area cellular network such as a 3G network, typically referred to as a macro cell network or a WAN) and smaller coverage (e.g., a residence-based or building-based network environment, typically referred to as a LAN). Here, as an access terminal ("AT") moves through such a network, the access terminal may be served in certain locations by access points that provide macro coverage while the access terminal may be served at other locations by access points that provide smaller coverage. In some aspects, the smaller coverage nodes may be used to provide incremental capacity growth, in-building coverage, and different services (e.g., for a more robust user experience). In such a case, a relatively large number of smaller coverage nodes may be present in a given area. Consequently, in a system where there is a limited number of transmission parameter values (e.g., phase offsets) that may be used by these nodes, there may be increased likelihood that two or more of these nodes use the same parameter values. In such a case, the teachings herein may be employed to distinguish between nodes the use the same parameters in order to identify a target node for a handoff operation.

In the description herein, a node that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. A simplified example of how femto nodes may be deployed in a network will now be described with reference to FIGS. 2-4.

Figure 2:
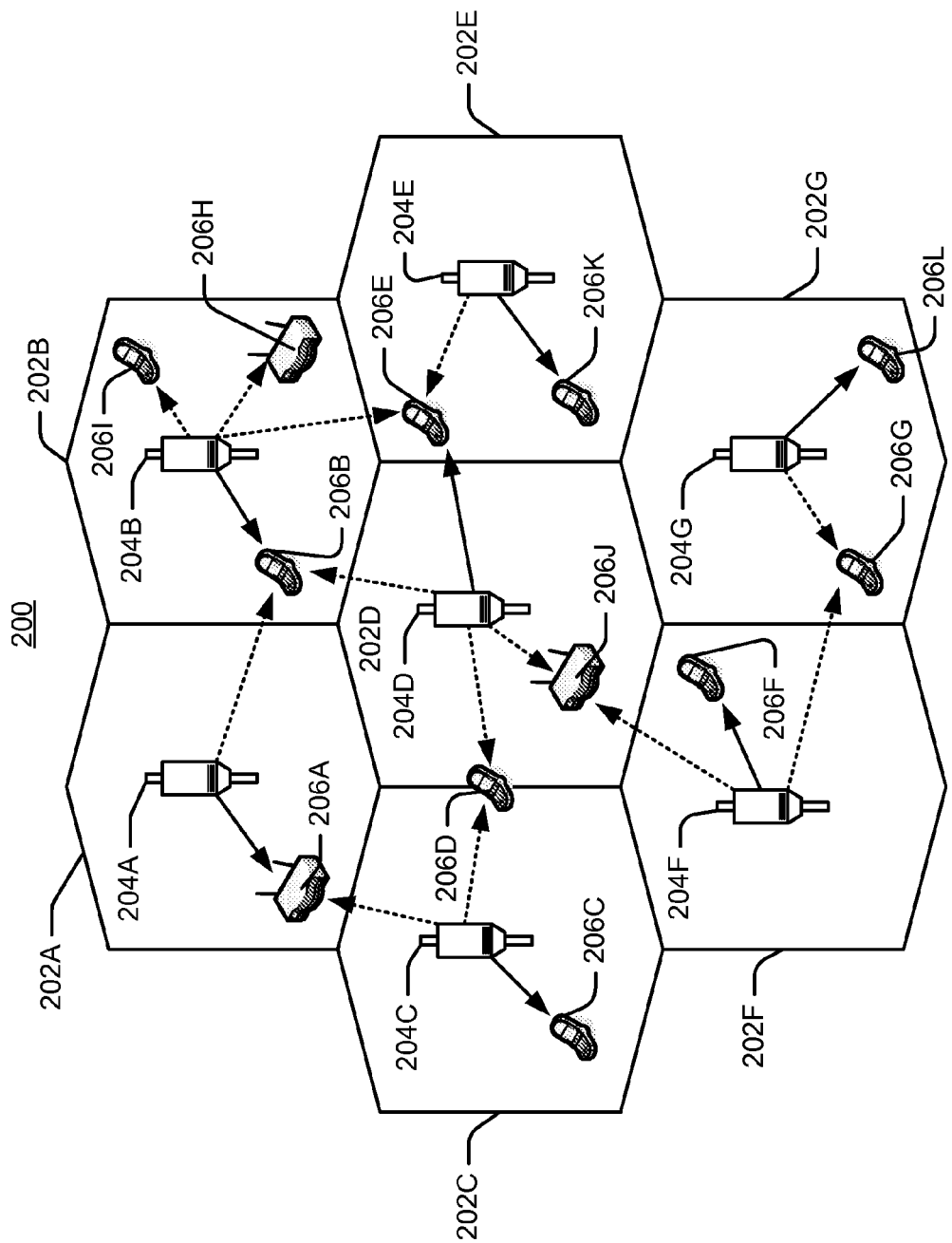
FIG. 2 is a simplified diagram of a wireless communication system including access points and access terminals.

FIG. 2 illustrates a wireless communication system 200, configured to support a number of users, in which the teachings herein may be implemented. The system 200 provides communication for multiple cells 202, such as, for example, macro cells 202A-202G, with each cell being serviced by a corresponding access point 204 (e.g., access points 204A-204G). As shown in FIG. 2, access terminals 206 (e.g., access terminals 206A-206L) may be dispersed at various locations throughout the system over time. Each access terminal 206 may communicate with one or more access points 204 on a forward link ("FL") and/or a reverse link ("RL) at a given moment, depending upon whether the access terminal 206 is active and whether it is in soft handoff, for example. The wireless communication system 200 may provide service over a large geographic region. For example, macro cells 202A-202G may cover a few blocks in a neighborhood or several square miles in rural environment.

Figure 3:
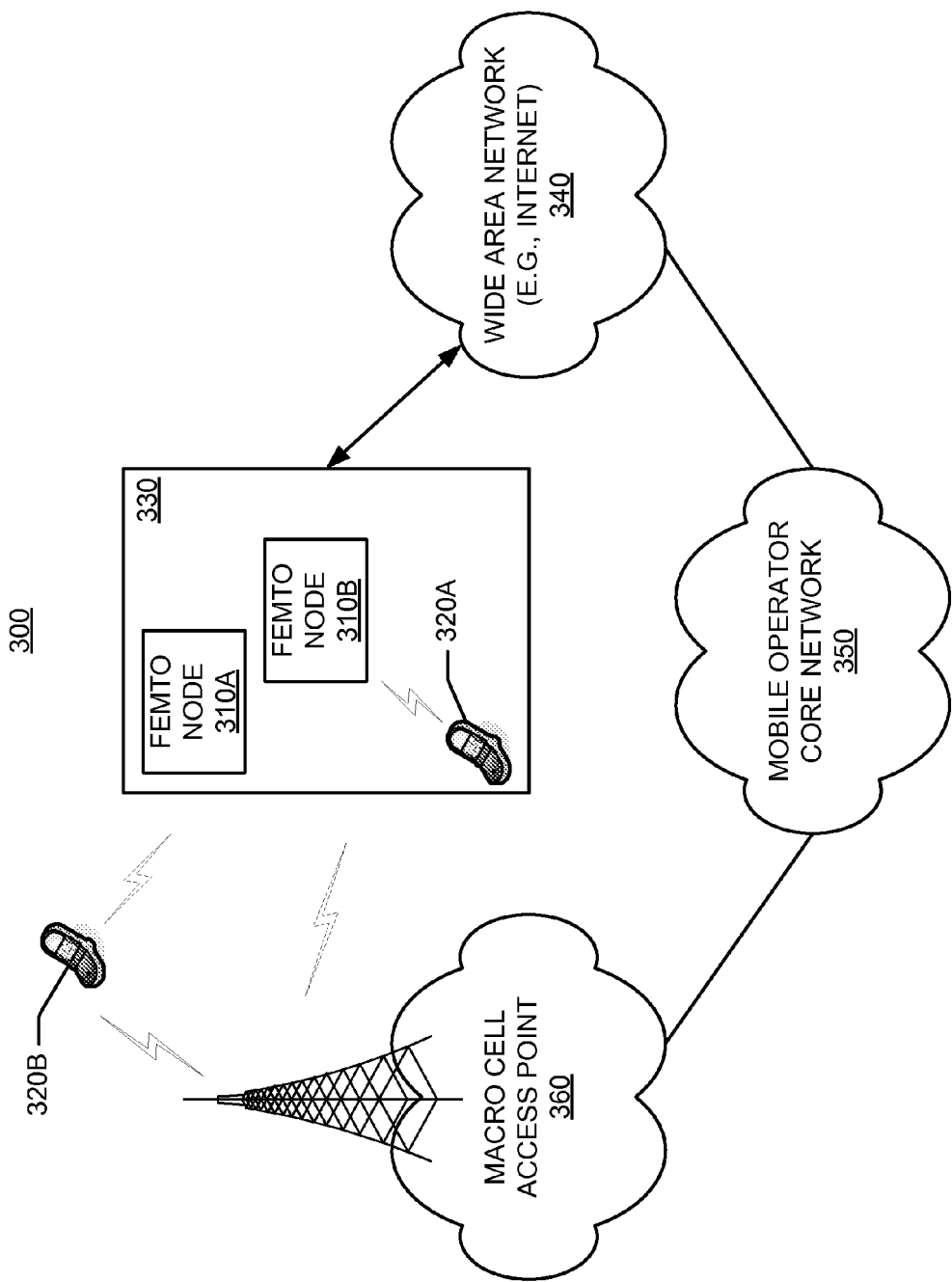
FIG. 3 is a simplified diagram of a wireless communication system including femto nodes.

FIG. 3 illustrates an exemplary communication system 300 where one or more femto nodes are deployed within a network environment. Specifically, the system 300 includes multiple femto nodes 310 (e.g., femto nodes 310A and 310B) installed in a relatively small coverage network environment (e.g., in one or more user residences 330). Each femto node 310 may be coupled to a wide area network 340 (e.g., the Internet) and a mobile operator core network 350 via a DSL router, a cable modem, a wireless link, or other connectivity means (not shown).

The owner of a femto node 310 may subscribe to mobile service, such as, for example, 3G mobile service, offered through the mobile operator core network 350. In addition, an access terminal 320 may be capable of operating both in macro environments and in smaller coverage (e.g., residential) network environments. In other words, depending on the current location of the access terminal 320, the access terminal 320 may be served by a macro cell access point 360 associated with the mobile operator core network 350 or by any one of a set of femto nodes 310 (e.g., the femto nodes 310A and 310B that reside within a corresponding user residence 330). For example, when a subscriber is outside his home, he may be served by a standard macro access point (e.g., access point 360) and when the subscriber is near or inside his home, he may be served by a femto node (e.g., node 310A). Here, a femto node 310 may be backward compatible with legacy access terminals 320.

Figure 4:
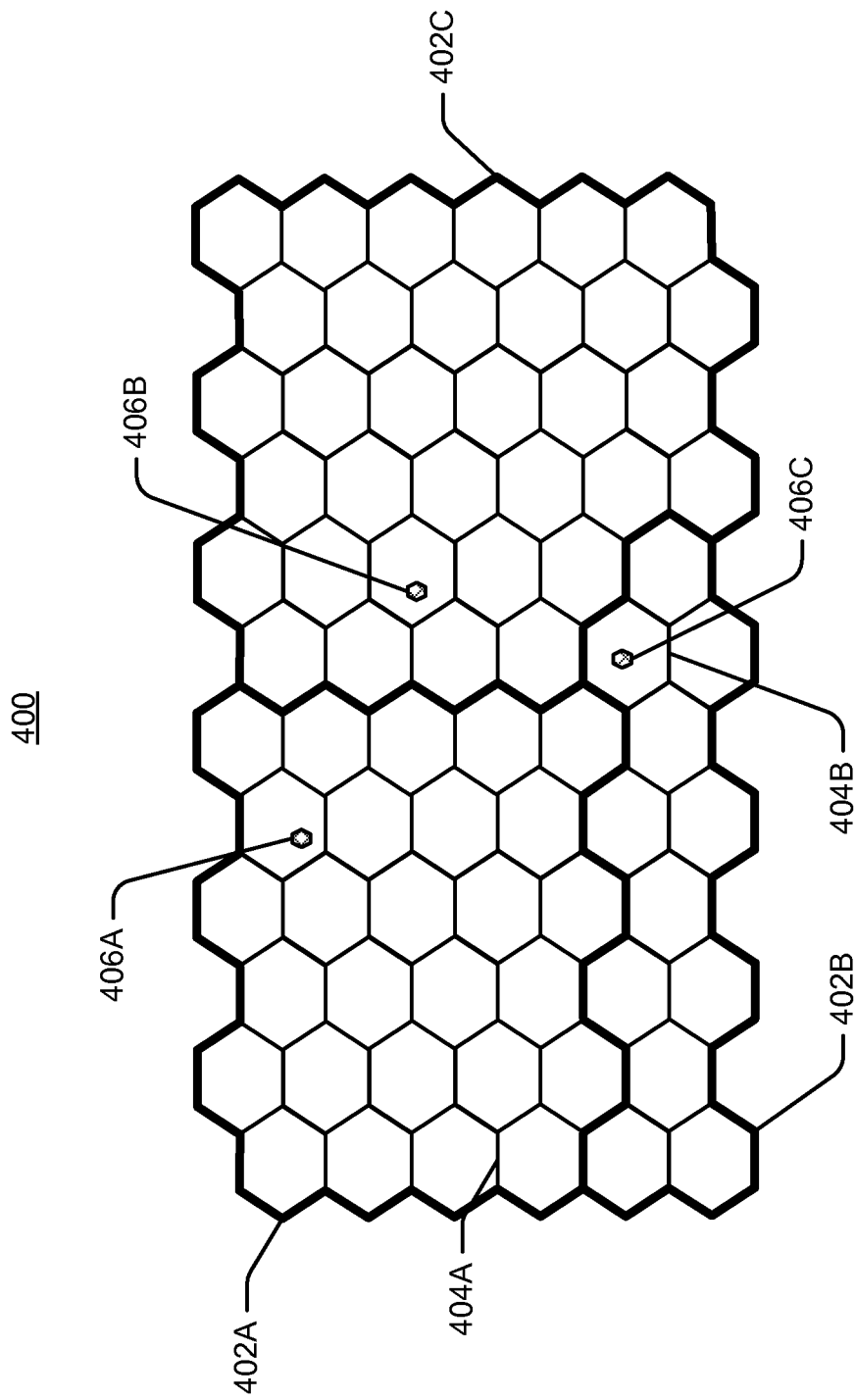
FIG. 4 is a simplified diagram illustrating sample coverage areas for wireless communication.

FIG. 4 illustrates an example of a coverage map 400 where several tracking areas 402 (or routing areas or location areas) are defined, each of which includes several macro coverage areas 404. Here, areas of coverage associated with tracking areas 402A, 402B, and 402C are delineated by the wide lines and the macro coverage areas 404 are represented by the hexagons. The tracking areas 402 also include femto coverage areas 406. In this example, each of the femto coverage areas 406 (e.g., femto coverage area 406C) is depicted within a macro coverage area 404 (e.g., macro coverage area 404B). It should be appreciated, however, that a femto coverage area 406 may not lie entirely within a macro coverage area 404. Also, one or more pico coverage areas (not shown) may be defined within a given tracking area 402 or macro coverage area 404.

In practice, a large number of femto coverage areas 406 may be defined with a given tracking area 402 or macro coverage area 404. Consequently, when an access terminal detects a signal in such a network, the teachings herein may be employed to effectively identify which access point (e.g., which femto node) transmitted that signal. Once this access point is identified, the access terminal may be handed-off to that access point, if desired.

Additional details relating to handoff operations that may be performed in accordance with the teachings herein will now be described with reference to the flowchart of FIGS. 5A and 5B. In the example of FIG. 1, these operations may relate to the access terminal 108 initially being served by the macro access point 102 and then being handed-in to a femto node (e.g., access point 104). The term "hand-in" refers to handing-off from a macro cell to a femto cell. It should be appreciated that the teachings herein may be applicable to other types of handoff operations (e.g., a handoff from one femto node to another femto node).

A network that includes femto nodes may include one or more network entities that facilitate macro-to-femto interoperability. For example, such an entity may maintain information (e.g., connectivity, location, and configuration information) for each of the femto nodes in the network. In various implementations such an entity may be implemented as a stand-alone component or integrated into other common network components. For convenience, in the discussion that follows such functionality will be described as being implemented in the network node 110.

Figure 5A:
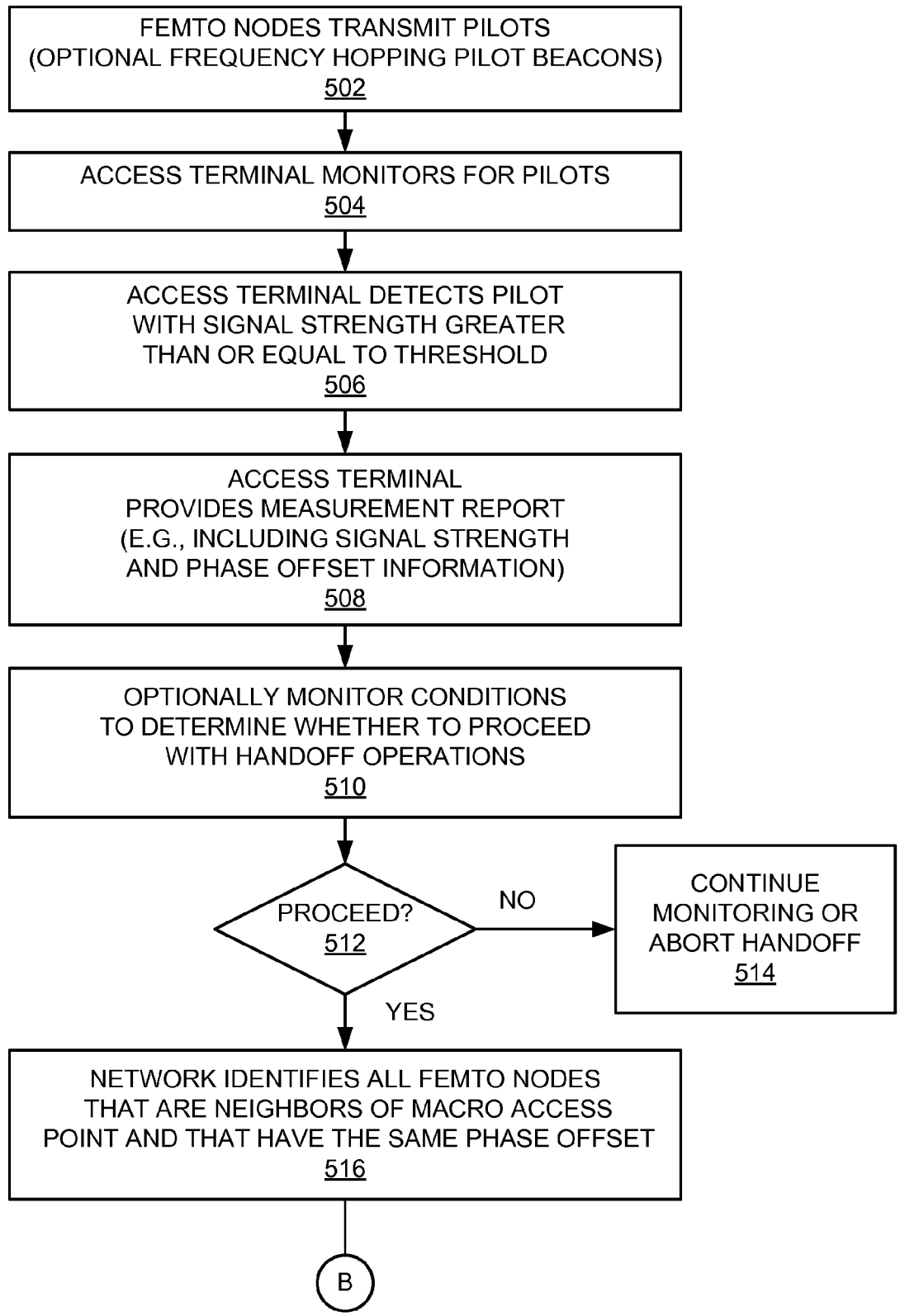
FIGS. 5A and 5B are a flowchart illustrating several aspects of sample operations that may be performed to perform handoff operations in accordance with the teachings herein.
Figure 5B:
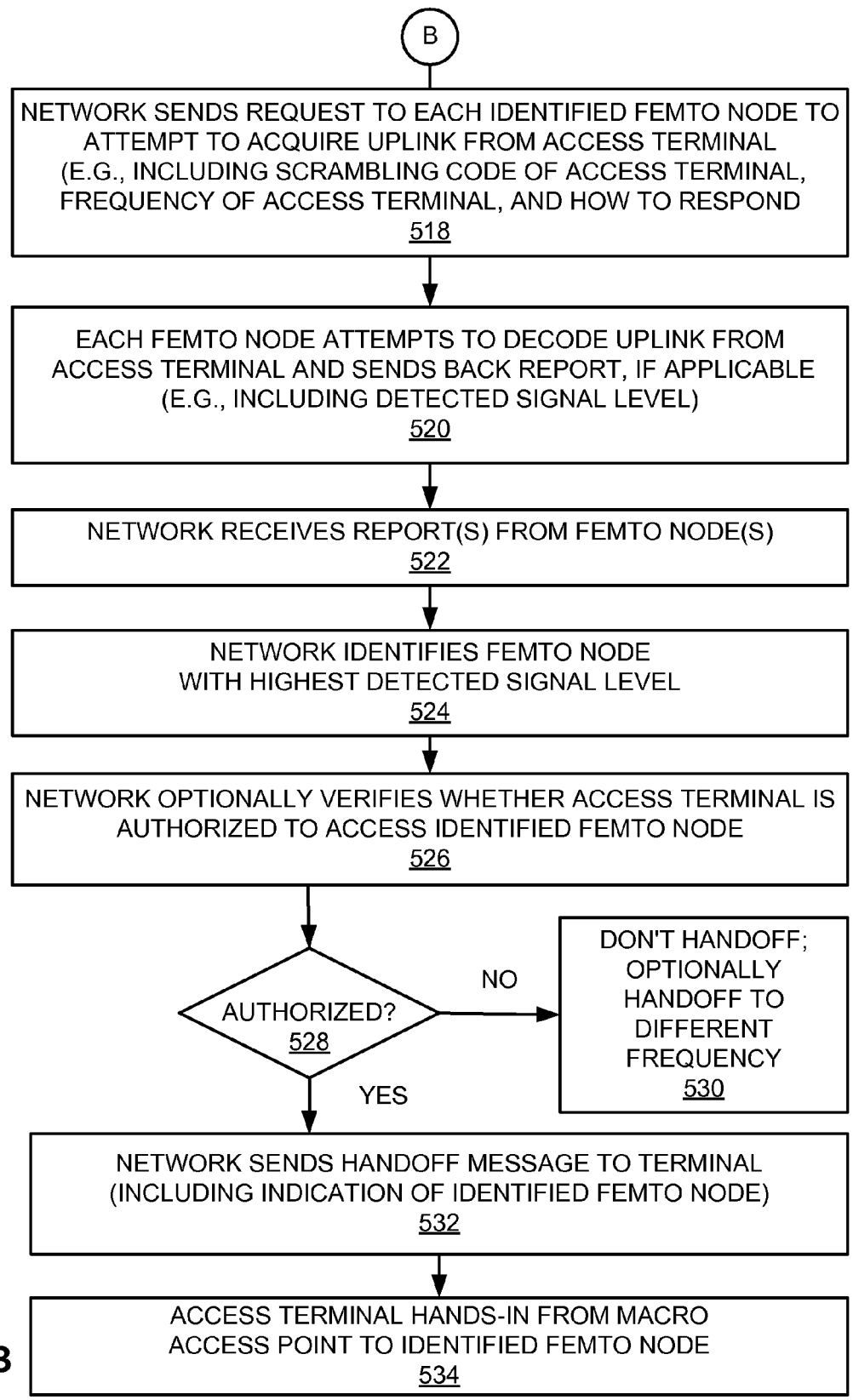
Figure 6:
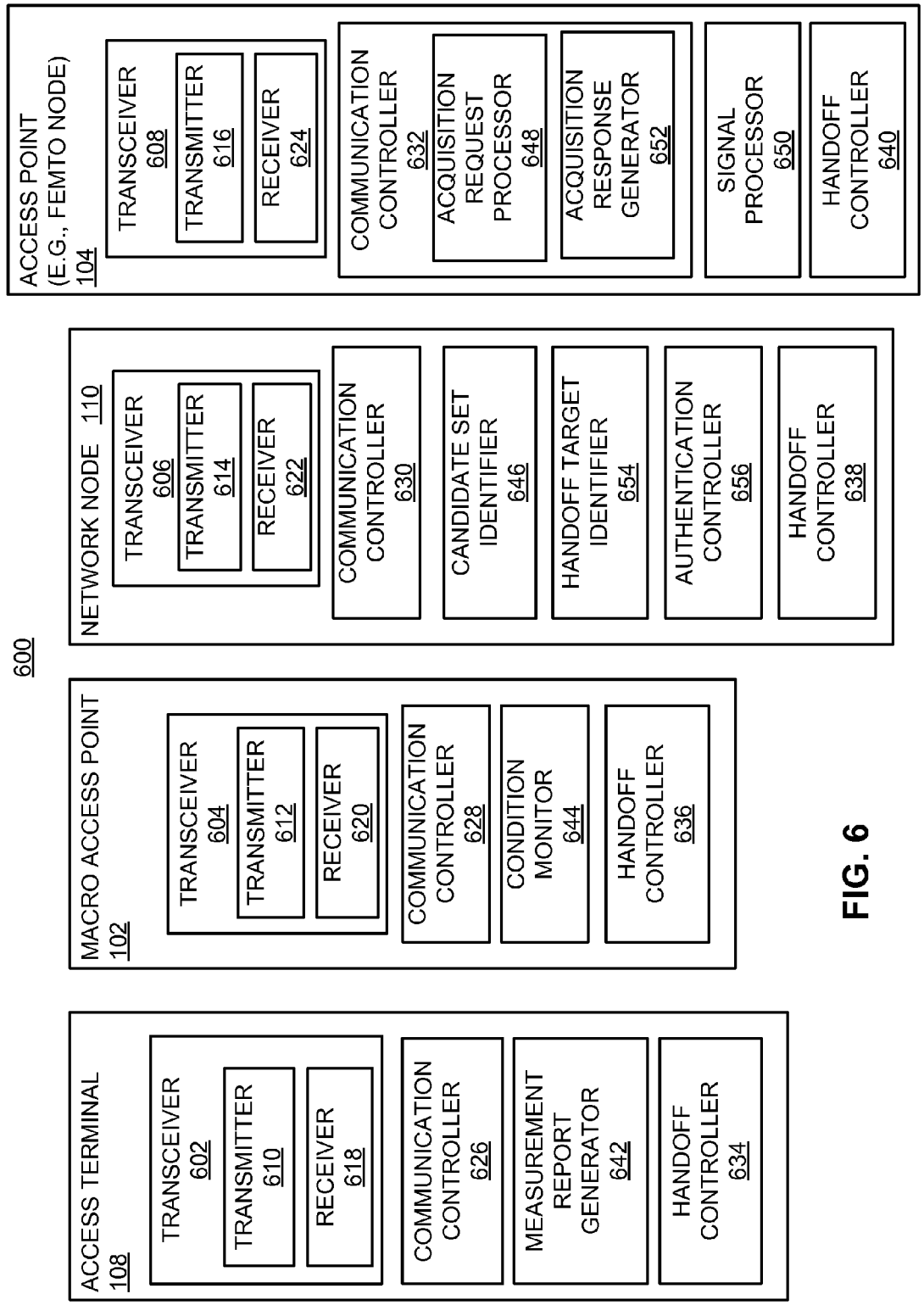
FIG. 6 is a simplified block diagram of several sample components of nodes configured to perform handoff operations in accordance with the teachings herein.

For illustration purposes, the operations of FIGS. 5A and 5B (or any other operations discussed or taught herein) may be described as being performed by specific components (e.g., components of the system 100 and/or of a system 600 as shown in FIG. 6). It should be appreciated, however, that these operations may be performed by other types of components and may be performed using a different number of components. It also should be appreciated that one or more of the operations described herein may not be employed in a given implementation.

FIG. 6 illustrates several sample components that may be incorporated into the access terminal 108, the access point 102, the network node 110, and the access point 104 in accordance with the teachings herein. It should be appreciated that the components illustrated for a given one of these nodes also may be incorporated into other nodes in a communication system. For example, the access point 106 may include components similar to those described for access point 104 or access point 102. It should be appreciated that a node may contain one or more given components, for example, an access point may contain multiple receivers to operate on multiple frequencies and serve multiple access terminals simultaneously.

The access terminal 108, the access point 102, the network node 110, and the access point 104 include transceivers 602, 604, 606, and 608, respectively, for communicating with each other and with other nodes. Each transceiver includes a respective transmitter (transmitters 610, 612, 614, and 616) for sending signals (e.g., messages) and a respective receiver (receivers 618, 620, 622, and 624) for receiving signals.

The nodes of FIG. 6 also include other components that may be used in conjunction with handoff operations as taught herein. For example, the nodes may include respective communication controllers 626, 628, 630, and 632 for managing communication with other nodes (e.g., sending and receiving messages/indications) and for providing other related functionality as taught herein. The nodes may include respective handoff controllers 634, 636, 638, and 640 for facilitating handoff operations and for providing other related functionality as taught herein. Sample operations of the other components of FIG. 6 are described below. For purposes of illustration, certain nodes are depicted in FIG. 6 as having certain functionality relating to supporting handoff. It should be appreciated, however, that one or more of the illustrated components may be employed in another one of these nodes or some other node.

Referring now to FIG. 5A, as represented by block 502, the femto nodes in the system transmit pilots (or beacons) so that any nearby access terminals may detect the presence of the femto nodes. As mentioned above, a relatively large number of femto nodes may be deployed within a macro coverage area. Consequently, there may be some reuse of communication resources between neighboring femto nodes. For example, a given network may allocate a fixed number of PN phase offsets (e.g., 64). In the event there are more femto nodes than phase offsets in a given area (e.g., within coverage of a macro AP), reuse of the phase offsets may occur. As a result, multiple femto nodes may transmit signals with similar characteristics in a given area.

Femto nodes in a network may be configured to operate on a single frequency or on multiple frequencies. For example, in some implementations all femto nodes (or all restricted femto nodes) in a region may operate on a designated femto channel (or femto channels). Depending on the particular configuration, the single frequency or one or more of the multiple frequencies may overlap with one or more frequencies used by a macro access point. Consequently, provisions may be made to ensure that an access terminal operating on a given frequency on a macro node may receive at least a portion of the beacons transmitted by a femto node. For example, a femto node may employ frequency hopping whereby at various times the femto node transmits beacons on each of a defined set of frequencies (e.g., corresponding to femto and macro channels).

As represented by block 504, the accessed terminal 108 (e.g., the receiver 618) may monitor the downlink for pilot signals on a regular basis. When on an active call, the access terminal 108 searches and monitors downlink for pilots nearly continuously. In conjunction with this monitoring, the access terminal 108 may identify one or more characteristics associated with any detected signals. For example, based on a neighbor report received from the serving macro access point 102, the access terminal 108 may monitor for signals having certain PN sequence phase offsets. In the event such signals are detected, the access terminal 108 may measure the corresponding received signal strength of these signals.

As represented by block 506, one or more conditions may be specified as potential triggers for a handoff operation. For example, a potential handoff may be indicated if the received signal strength of a pilot signal is greater than or equal to a threshold value.

As represented by block 508, the access terminal 108 (e.g., a measurement report generator 642) may generate a report relating to the downlink signals received by the access terminal 108 and provide this report to the access point 102. The access point 102 may then forward this information to the network (e.g., the network node 110). As mentioned above, the measurement report may include information such as the phase offset and the received signal strength for a given signal. For example, the report may comprise pilot strength measurements that include a received signal strength value (e.g., $E_C/I_0$) for each pilot received by the access terminal 108, PN sequence offsets of all pilots received by the access terminal 108, and the PN sequence offset of the access terminal 108 (e.g., which it uses as its timing reference).

As represented by block 510-514, the access point 102 and/or the network node 110 may optionally monitor signals or other related conditions associated with the access terminal 108 to determine whether handoff is warranted or to determine optimum timing for handoff. For example, the macro network may monitor channel performance at the macro level and/or at the femto level. In the example of FIG. 6, a condition monitor 644 of the access point 102 may monitor channel performance conditions such as power levels and/or frame errors associated with communication with the access terminal 108. Here, rather than immediately proceed with a handoff as a result of the threshold condition being met at block 506, the macro network may monitor conditions over a period of time to ensure, for example, that the handoff trigger is not a transient event. Also, the macro network may elect to not proceed with a handoff operation if acceptable signal conditions exist between the access point 102 and the access terminal 108. For example, handoff may not be warranted if there is a low error rate and/or high quality of service on a link between the access point 102 and the access terminal 108. Similarly, handoff may not be warranted if the signal strength of signals received at the access terminal 108 from the access point 102 is sufficiently high (e.g., greater than the signal strength from the measurement report of block 508).

Thus, as represented by block 514, the macro network (e.g., the access point 102) may continue monitoring selected conditions until it determines whether a handoff should be performed. In the event a decision is made to not proceed with the handoff operation, the access terminal 108 may remain on the macro network.

As represented by block 516, in the event a decision is made to proceed with the handoff operation, the network node 110 (e.g., a candidate set identifier 646) may analyze the measurement report from the access terminal 108 to identify one or more signal characteristics associated with the signal received by the access terminal 108. In some implementations, the network node 110 may be able to determine that the signal was transmitted by a femto node based on one or more of these characteristics. For example, a known subset of the PN phase offsets available for use in a macro network may be dedicated for use by femto nodes.

In the event it is determined that the access terminal 108 received a signal from a femto node, the candidate set identifier 646 will identify a subset of the femto nodes in the system that may have transmitted the signal. For example, the network node 110 may maintain or obtain information (e.g., neighbor and other configurations of the access points) that indicates where femto nodes are deployed in the network. The candidate set identifier 646 may therefore use this information to identify, for example, the femto nodes that are deployed in the vicinity of the current serving access point (e.g., access point 102) for the access terminal 108. In this way, the network node 110 may identify the subset of femto nodes that are in the neighborhood of the access terminal 108 and that are therefore capable of generating a signal that may be received by the access terminal 108.

In addition, the candidate set identifier 646 may determine which of the identified femto nodes could have generated signals that match the signals received by the access terminal 108. For example, the network node 110 may maintain or obtain information that indicates the PN phase offset (or some other suitable parameter) used by each femto node in the network. The candidate set identifier 646 may thus use this information to more accurately identify the femto nodes that may have generated the signal. As a result of the above tests, a set of target femto nodes that are candidates for being a target femto node for the access terminal 108 is defined.

In the event either of the above tests indicates that only a single femto node could have generated the signal (i.e., the candidate set includes only one femto node), the operational flow may proceed to block 526 for subsequent handoff operations for this target femto node. Alternatively, if more than one candidate femto node is identified at block 516, the operational flow proceeds to blocks 518-524 to identify a single target femto node.

As represented by block 518, the network node 110 sends a message to each of the femto nodes in the candidate set, whereby each message requests a femto node to attempt to process (e.g., acquire) uplink signals from the access terminal 108. In some aspects, these requests may take the form of handoff request messages that inform the femto nodes of a potential impending handoff and will, thereby, cause the femto nodes to monitor the uplink for handoff messages from the access terminal 108.

In some aspects, these requests may include information relating to the channel parameters assigned to the connection of the access terminal 108 to enable the femto nodes to process uplink transmissions from the access terminal 108. For example, a request may indicate the scrambling code used by the access terminal 108 on the uplink. In addition, in the event a given femto node is operating on a different frequency than the access terminal 108, the request may indicate an operating frequency (e.g., a carrier frequency) of the access terminal 108.

Also, in some implementations the request may include information regarding how the femto node should respond to the request. For example, the femto nodes may be instructed to reply to the request irrespective of whether the femto node successfully acquired signals from the access terminal 108. In addition, the femto nodes may be instructed to reply with certain information regarding any signals that were acquired. It should be appreciated that in other implementations the manner in which a femto node should respond to a request may be preconfigured or may be controlled in some other manner.

As represented by block 520, upon receiving a request, each femto node in the candidate set attempts to acquire uplink transmissions from the access terminal 108. For example, an acquisition request processor 648 of the access point 104 may instruct the receiver 624 to monitor for signals on the uplink and instruct a signal processor 650 to process any signals received by the receiver 624 based on the parameters received in the request (e.g., scrambling code, frequency, etc.). For example, the signal processor 650 may attempt to demodulate and decode the received signals. In addition, in the event the access point 104 successfully acquires a signal from access point 108, the signal processor 650 may generate information relating to the acquired signals. For example, in some implementations an indication of the signal energy received from the access terminal 108 is generated.

Based on the results of the acquisition operations, an acquisition response generator 652 (e.g., corresponding to report generator 116) may send a response to the network node 110 that indicates whether the access point 104 successfully acquired (e.g., decoded) a signal from the access terminal 108. For example, in some implementations a response is sent only if the access point 104 successfully acquired a signal from the access terminal 108. In other implementations, a negative acknowledgment may be sent if the access point did not acquire a signal from the access terminal 108. In some implementations, the response may include information relating to the acquired signals (e.g., received signal strength).

As represented by block 522, the network node 110 receives one or more reports from one or more of the candidate set femto nodes. In the event only one response is received, it may be assumed that the femto node that sent the response is the only femto node that could have transmitted the signal received by the access terminal 108. In this case, the operational flow may proceed to block 526 for subsequent handoff operations.

Alternatively, if more than one candidate femto node indicates that it has acquired a signal from the access terminal 108, the operational flow proceeds to block 524 to identify a single target femto node. In some implementations identification of the target femto node is based on the signals each of the femto nodes received from the access terminal 108. For example, a handoff target identifier 654 of the network node 110 may be configured to select a target femto node based on the magnitude of the received signal strength reported by the candidate femto nodes. Here, it may be assumed that the femto node that reports the highest received signal strength is closer to the access terminal 108 than the other femto nodes. Consequently, it may be determined that this femto node is the best candidate femto node for a handoff operation.

As represented by blocks 526 and 528, in some implementations the network (e.g., an authentication controller 656) may verify whether the access terminal 102 is authorized to access the identified femto node. If the access terminal 102 is not authorized (block 530), the network may abort handing-off the access terminal 108 which may result in the access terminal 108 remaining on the macro network. In some cases, the network may hand-off the access terminal 108 to operate on a different frequency, for example, on the macro-only frequency. This may be done, for example, to mitigate potential interference between the unauthorized access terminal 108 and the identified femto node.

The authentication operations of block 526 and 528 may be employed, for example, in cases where the identified femto node is restricted in some way. For example, a given femto node may be configured to only provide certain services to certain access terminals. In deployments with so-called restricted (or closed) association, a given access terminal may only be served by the macro cell mobile network and a defined set of femto nodes (e.g., the femto nodes 310 that reside within the corresponding user residence 330 as shown in FIG. 3). For example, in FIG. 3 each femto node 310 may be configured to serve associated access terminals 320 (e.g., access terminal 320A) and, optionally, guest access terminals 320 (e.g., access terminal 320B). In other words, access to femto nodes 310 may be restricted whereby a given access terminal 320 may be served by a set of designated (e.g., home)

femto node(s) 310 but may not be served by any non-designated femto nodes 310 (e.g., a neighbor's femto node 310).

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals. In some implementations, a node may be restricted to not provide, for at least one node, at least one of: signaling, data access, registration, paging, or service.

Various relationships may thus exist between a given femto node and a given access terminal. For example, from the perspective of an access terminal, an open femto node may refer to a femto node with open association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

Referring again to FIG. 5B, if the access terminal 102 is authorized to access the identified access point at block 528, the operational flow proceeds to blocks 532 and 534 to proceed with the handoff operation. Here, one or more of the handoff controllers 634, 636, 638, and 640 may cooperate to inform the access terminal 108 of the impending handoff and the identity (and, optionally, operating frequency) of the target femto node (block 532), provide the appropriate information to the target femto node (e.g., send a handoff request to the access point 104), and complete the handoff (block 534). For example, a network node 110 may send a handoff direction message to the access terminal 108, where the sole member of the active pilot set is the target femto node (e.g., hard handoff on the same frequency). The access terminal 108 and the target femto node begin demodulation over a link between the nodes and the access terminal 108 sends a handoff complete message to the target femto node.

Effective techniques for providing handoffs between communication nodes are thus disclosed. Advantageously, these techniques may be used with legacy terminals that are already in operation since no changes in radio signaling procedures may be needed to implement these techniques. In addition, such techniques may allow for maximum use of femto nodes that a given terminal is authorized to use. Also, in the event an access terminal is not authorized to access a femto node, these techniques allows for a relatively quick handoff to a different frequency than the frequency used by the femto node.

It should be appreciated that the teachings herein may be implemented in various types of communication devices. In some aspects, the teachings herein may be implemented in wireless devices that may be deployed in multiple access communication system that may simultaneously support communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 7:
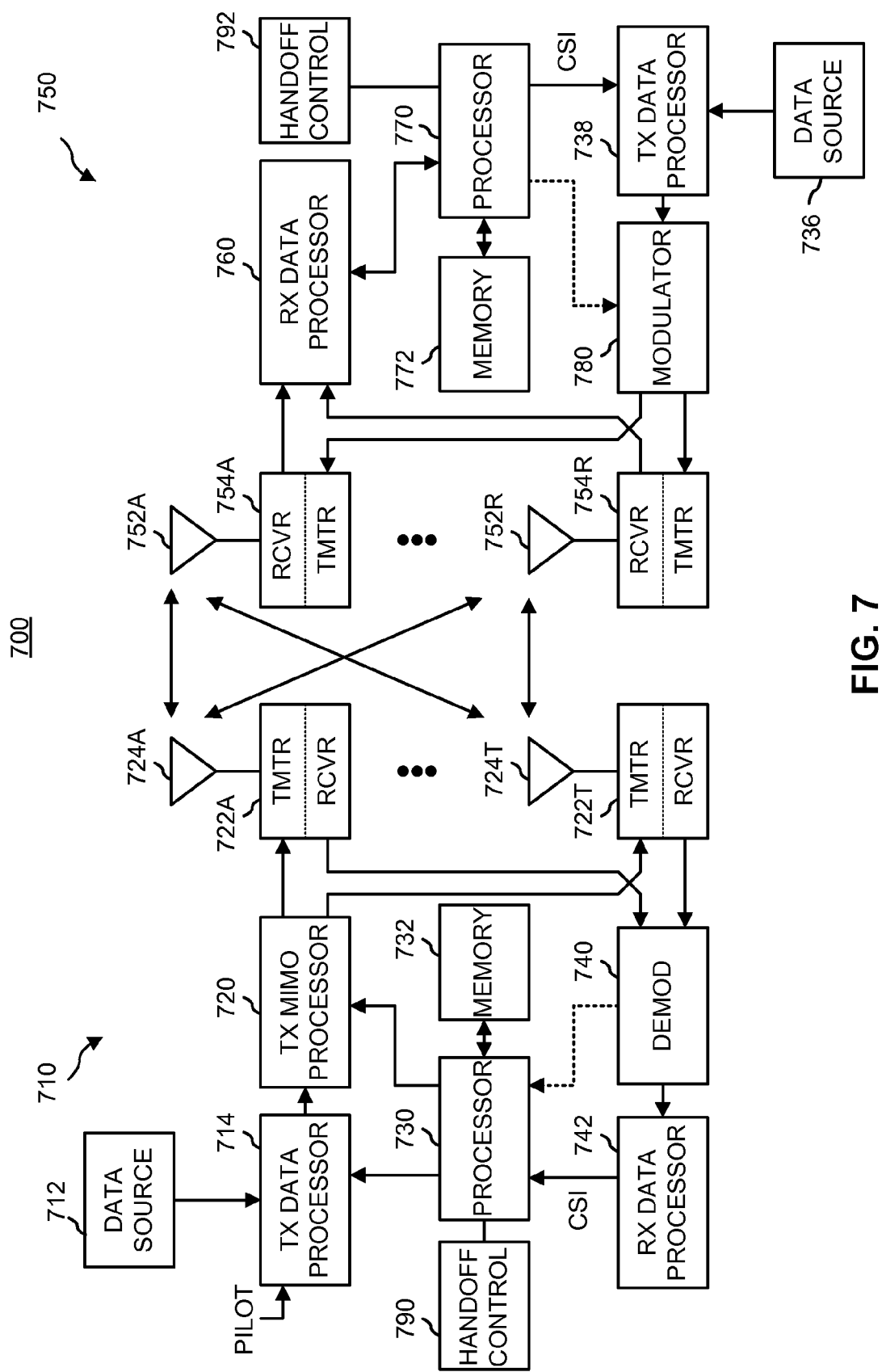
FIG. 7 is a simplified block diagram of several sample aspects of communication components.

The teachings herein may be incorporated into a node (e.g., a device) employing various components for communicating with at least one other node. FIG. 7 depicts several sample components that may be employed to facilitate communication between nodes. Specifically, FIG. 7 illustrates a wireless device 710 (e.g., an access point) and a wireless device 750 (e.g., an access terminal) of a MIMO system 700. At the device 710, traffic data for a number of data streams is provided from a data source 712 to a transmit ("TX") data processor 714.

In some aspects, each data stream is transmitted over a respective transmit antenna. The TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 730. A data memory 732 may store program code, data, and other information used by the processor 730 or other components of the device 710.

The modulation symbols for all data streams are then provided to a TX MIMO processor 720, which may further process the modulation symbols (e.g., for OFDM). The TX MIMO processor 720 then provides $N_T$ modulation symbol streams to $N_T$ transceivers ("XCVR") 722A through 722T. In some aspects, the TX MIMO processor 720 applies beamforming weights to the symbols of the data streams and to the antenna from which the symbol is being transmitted.

Each transceiver 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 722A through 722T are then transmitted from $N_T$ antennas 724A through 724T, respectively.

At the device 750, the transmitted modulated signals are received by $N_R$ antennas 752A through 752R and the received signal from each antenna 752 is provided to a respective transceiver ("XCVR") 754A through 754R. Each transceiver 754 conditions (e.g., filters, amplifies, and downconverts) a respective received signal, digitizes the conditioned signal to provide samples, and further processes the samples to provide a corresponding "received" symbol stream.

A receive ("RX") data processor 760 then receives and processes the $N_R$ received symbol streams from $N_R$ transceivers 754 based on a particular receiver processing technique to provide $N_T$ "detected" symbol streams. The RX data processor 760 then demodulates, deinterleaves, and decodes each detected symbol stream to recover the traffic data for the data stream. The processing by the RX data processor 760 is complementary to that performed by the TX MIMO processor 720 and the TX data processor 714 at the device 710.

A processor 770 periodically determines which pre-coding matrix to use (discussed below). The processor 770 formulates a reverse link message comprising a matrix index portion and a rank value portion. A data memory 772 may store program code, data, and other information used by the processor 770 or other components of the device 750.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by the transceivers 754A through 754R, and transmitted back to the device 710.

At the device 710, the modulated signals from the device 750 are received by the antennas 724, conditioned by the transceivers 722, demodulated by a demodulator ("DE-MOD") 740, and processed by a RX data processor 742 to extract the reverse link message transmitted by the device 750. The processor 730 then determines which pre-coding matrix to use for determining the beam-forming weights then processes the extracted message.

FIG. 7 also illustrates that the communication components may include one or more components that perform handoff operations as taught herein. For example, a handoff control component 790 may cooperate with the processor 730 and/or other components of the device 710 to send/receive handoff-related signals to/from another device (e.g., device 750) as taught herein. Similarly, a handoff control component 792 may cooperate with the processor 770 and/or other components of the device 750 to send/receive handoff-related signals to/from another device (e.g., device 710). It should be appreciated that for each device 710 and 750 the functionality of two or more of the described components may be provided by a single component. For example, a single processing component may provide the functionality of the handoff control component 790 and the processor 730 and a single processing component may provide the functionality of the handoff control component 792 and the processor 770.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (IxRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 8:
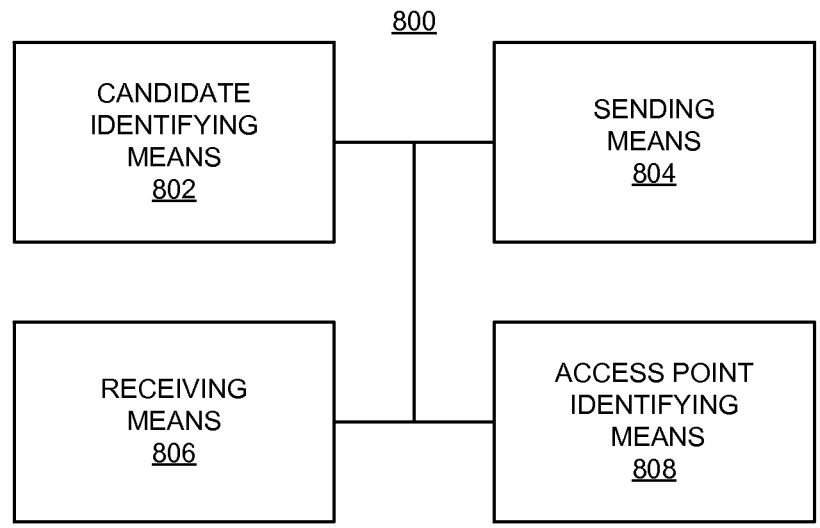
FIGS. 8 and 9 are simplified block diagrams of several sample aspects of apparatuses configured to facilitate communication handoff as taught herein.
Figure 9:
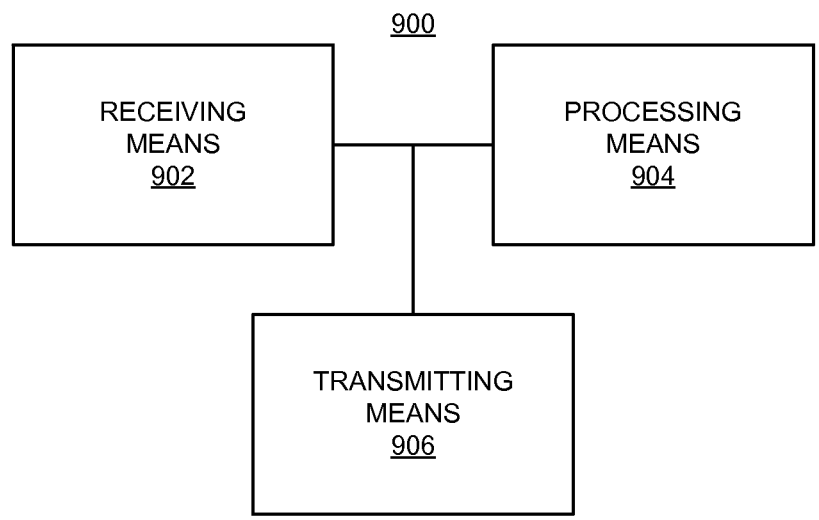

The components described herein may be implemented in a variety of ways. Referring to FIGS. 8 and 9, apparatuses 800 and 900 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein.

The apparatuses 800 and 900 may include one or more modules that may perform one or more of the functions described above with regard to various figures. For example, a candidate identifying means 802 may correspond to, for example, a candidate set identifier as discussed herein. A sending means 804 may correspond to, for example, a candidate set identifier as discussed herein. A receiving means 806 may correspond to, for example, a target identifier as discussed herein. An access point identifying means 808 may correspond to, for example, a target identifier as discussed herein. A receiving means 902 may correspond to, for example, a communication controller as discussed herein. A processing means 904 may correspond to, for example, a signal processor as discussed herein. A transmitting means 906 may correspond to, for example, a communication controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach.

Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
    receiving, at a network node, a report that an access terminal provided to a source access point and that the source access point forwarded to the network node, wherein the report comprises a received signal strength value for each pilot signal received at the access terminal, a pseudorandom number (PN) sequence phase offset of all pilot signals received at the access terminal, and a PN sequence phase offset of the access terminal;
    identifying by the network node a plurality of candidate target access points comprising neighbors of the source access point for a handoff operation for the access terminal based on the report provided by the access terminal, wherein the plurality of candidate target access points transmit pilot signals having the same PN sequence phase offset as at least one of the pilot signals received at the access terminal, and wherein the access terminal received the at least one pilot signal from one of the identified plurality of candidate target access points;
    sending by the network node a message to each of the identified candidate target access points that transmit the pilot signals having the same PN sequence phase offset as the at least one pilot signal received at the access terminal to request each candidate target access point to monitor uplink signals from the access terminal based on parameters in the message;
    receiving at the network node at least one response to at least one of the messages; and
    identifying one of the plurality of candidate target access points that transmitted the at least one pilot signal received at the access terminal for the handoff operation based on the at least one response.

2. The method of claim 1, wherein identifying the plurality of candidate target access points comprises:
    identifying access points in a defined geographic area that transmit the pilot signals having the same PN sequence phase offset as the at least one pilot signal received at the access terminal.

3. The method of claim 2, wherein identifying the access points in the defined geographic area comprises identifying the neighbors of the source access point.

4. The method of claim 1, wherein the at least one response indicates a signal strength of a signal received at one of the access points from the access terminal.

5. The method of claim 1, wherein identifying the one of the plurality of candidate target access points comprises:
    determining, for each of the plurality of candidate target access points, a signal strength of a signal received from the access terminal; and
    determining which access point of the plurality of candidate target access points is associated with a highest one of the determined signal strengths.

6. The method of claim 1, wherein the parameters in each message indicate at least one of an uplink spreading code used by the access terminal, a carrier frequency used by the access terminal, or how to respond to the message.

7. The method of claim 1, wherein the at least one response indicates whether at least one of the plurality of candidate target access points decoded a signal from the access terminal.

8. The method of claim 1, wherein each candidate target access point comprises a femto node or a pico node.

9. The method of claim 1, wherein the handoff operation comprises a hand-in from a macro access point to the identified one of the plurality of candidate target access points.

10. The method of claim 1, wherein:
    each candidate target access point is restricted to not provide, for at least one other access terminal, at least one of signaling, data access, registration, or service; and
    a decision to perform the handoff operation is based on whether the access terminal is authorized to access the identified one of the plurality of candidate target access points.

11. The method of claim 10, wherein the access terminal is handed-off to a femto channel used by the identified one of the plurality of candidate target access points if the access terminal is authorized to access the identified one of the plurality of candidate target access points.

12. The method of claim 1, wherein identifying the plurality of candidate target access points comprises:
    determining which of the neighbors of the source access point are capable of generating pilot signals that match the at least one pilot signal received at the access terminal.

13. The method of claim 1, further comprising processing the at least one response, wherein the processing further comprises determining a power of an uplink signal received at one of the plurality of candidate target access points from the access terminal.

14. An apparatus for communication, comprising:
  means for receiving, at a network node, a report that an access terminal provided to a source access point and that the source access point forwarded to the network node, wherein the report comprises a received signal strength value for each pilot signal received at the access terminal, a pseudorandom number (PN) sequence phase offset of all pilot signals received at the access terminal, and a PN sequence phase offset of the access terminal;
  means for identifying a plurality of candidate target access points comprising neighbors of the source access point for a handoff operation for the access terminal based on the report provided by the access terminal, wherein the plurality of candidate target access points transmit pilot signals having the same PN sequence phase offset as at least one of the pilot signals received at the access terminal, and wherein the access terminal received the at least one pilot signal from one of the identified plurality of candidate target access points;
  means for sending a message to each of the identified plurality of candidate target access points that transmit the pilot signals having the same PN sequence phase offset as the at least one pilot signal received at the access terminal to request each candidate target access point to monitor uplink signals from the access terminal based on parameters in the message;
  means for receiving at least one response to at least one of the messages; and
  means for identifying the one of the plurality of candidate target access points that transmitted the at least one pilot signal received at the access terminal for the handoff operation based on the at least one response.

15. The apparatus of claim 14, wherein the means for identifying the plurality of candidate target access points comprises:
  means for identifying access points in a defined geographic area that transmit the pilot signals having the same PN sequence phase offset as the at least one pilot signal received at the access terminal.

16. The apparatus of claim 15, wherein the means for identifying the access points in the defined geographic area comprises means for identifying the neighbors of the source access point.

17. The apparatus of claim 14, wherein the at least one response indicates a signal strength of a signal received at one of the access points from the access terminal.

18. The apparatus of claim 14, wherein the means for identifying the one of the plurality of candidate target access points comprises:
  means for determining, for each of the plurality of candidate target access points, a signal strength of a signal received from the access terminal; and
  means for determining which access point of the plurality of candidate target access points is associated with a highest one of the determined signal strengths.

19. The apparatus of claim 14, wherein the parameters in each message indicate at least one of an uplink spreading code used by the access terminal, a carrier frequency used by the access terminal, or how to respond to the message.

20. The apparatus of claim 14, wherein the at least one response indicates whether at least one of the plurality of candidate target access points decoded a signal from the access terminal.

21. The apparatus of claim 14, wherein each candidate target access point comprises a femto node or a pico node.

22. The apparatus of claim 14, wherein the handoff operation comprises a hand-in from a macro access point to the identified one of the plurality of candidate target access points.

23. The apparatus of claim 14, wherein:
  each candidate target access point is restricted to not provide, for at least one other access terminal, at least one of signaling, data access, registration, or service; and
  a decision to perform the handoff operation is based on whether the access terminal is authorized to access the identified one of the plurality of candidate target access points.

24. The apparatus of claim 23, wherein the access terminal is handed-off to a femto channel used by the identified one of the plurality of candidate target access points if the access terminal is authorized to access the identified one of the plurality of candidate target access points.

25. An apparatus for communication, comprising:
  a candidate identifier configured to:
    receive a report that an access terminal provided to a source access point and that the source access point forwarded to the apparatus, wherein the report comprises a received signal strength value for each pilot signal received at the access terminal, a pseudorandom number (PN) sequence phase offset of all pilot signals received at the access terminal, and a PN sequence phase offset of the access terminal;
    identify a plurality of candidate target access points comprising neighbors of the source access point for a handoff operation for the access terminal based on the report provided by the access terminal, wherein the identified plurality of candidate target access points transmit pilot signals having the same PN sequence phase offset as at least one of the pilot signals received at the access terminal, and wherein the access terminal received the at least one pilot signal from one of the identified plurality of candidate target access points; and
    send a message to each of the identified plurality of candidate target access points that transmit the pilot signals having the same PN sequence phase offset as the at least one pilot signal received at the access terminal to request each candidate target access point monitor uplink signals from the access terminal based on parameters in the message; and
  a target identifier configured to receive at least one response to at least one of the messages and to identify the one of the plurality of candidate target access points that transmitted the at least one pilot signal received at the access terminal for the handoff operation based on the at least one response.

26. The apparatus of claim 25, wherein the candidate identifier is further configured to:
  identify access points in a defined geographic area that transmit the pilot signals having the same PN sequence phase offset as the at least one pilot signal received at the access terminal.

27. The apparatus of claim 26, wherein the candidate identifier is further configured to identify the neighbors of the source access point to identify the access points in the defined geographic area.

28. The apparatus of claim 25, wherein the target identifier is further configured to:

determine, for each of the plurality of candidate target access points, a signal strength of a signal received from the access terminal; and determine which access point of the plurality of candidate target access points is associated with a highest one of the determined signal strengths.

29. A non-transitory computer-readable medium comprising codes for causing a computer to:

receive a report that an access terminal provided to a source access point and that the source access point forwarded to the computer, wherein the report comprises a received signal strength value for each pilot signal received at the access terminal, a pseudorandom number (PN) sequence phase offset of all pilot signals received at the access terminal, and a PN sequence phase offset of the access terminal;

identify a plurality of candidate target access points comprising neighbors of the source access point for a handoff operation for the access terminal based on the report provided by the access terminal, wherein the plurality of candidate target access points transmit pilot signals having the same PN sequence phase offset as at least one of the pilot signals received at the access terminal, and wherein the access terminal received the at least one pilot signal from one of the identified plurality of candidate target access points;

send a message to each of the identified plurality of candidate target access points that transmit the pilot signals having the same PN sequence phase offset as the at least one pilot signal received at the access terminal to request each candidate target access point to monitor uplink signals from the access terminal based on parameters in the message;

receive at least one response to at least one of the messages; and identify the one of the plurality of candidate target access points that transmitted the at least one pilot signal received at the access terminal for the handoff operation based on the at least one response.

30. The non-transitory computer-readable medium of claim 29, wherein the codes for causing the computer to identify the plurality of candidate target access points comprises codes for causing the computer to:

identify access points in a defined geographic area that transmit the pilot signals having the same PN sequence phase offset as the at least one pilot signal received at the access terminal.

31. The non-transitory computer-readable medium of claim 30, wherein the codes for causing the computer to identify the access points in the defined geographic area comprises codes for causing the computer to identify the neighbors of the source access point.

32. The non-transitory computer-readable medium of claim 29, wherein the codes for causing the computer to identify the one of the plurality of candidate target access points comprises codes for causing the computer to:

determine, for each of the plurality of candidate target access points, a signal strength of a signal received from the access terminal; and determine which access point of the plurality of candidate target access points is associated with a highest one of the determined signal strengths.

33. A method of communication, comprising:

receiving, at a candidate access point, a request to the candidate access point to monitor uplink signals from an access terminal based on parameters in the request, wherein the candidate access point comprises one of a plurality of neighbors of a source access point that were identified by a network node based on a report that the access terminal provided to the source access point and that the source access point forwarded to the network node and further based on the candidate access point transmitting pilot signals having the same pseudorandom number (PN) sequence phase offset as at least one pilot signal received at the access terminal, wherein the access terminal received the at least one pilot signal from one of the plurality of neighbors of the source access point, and wherein the report provided by the access terminal comprises a received signal strength value for each pilot signal received at the access terminal, a PN sequence phase offset of all pilot signals received at the access terminal, and a PN sequence phase offset of the access terminal;

monitoring, at the candidate access point, the uplink signals from the access terminal based on the parameters in the request; and transmitting a response to the request, wherein the response indicates a signal strength of the monitored uplink signals from the access terminal, and wherein the network node determines whether the candidate access point transmitted the at least one pilot signal received at the access terminal based on the response to the request.

34. The method of claim 33, wherein:

the monitoring comprises decoding the uplink signals from the access terminal; and the response further indicates that the candidate access point decoded the uplink signals from the access terminal.

35. The method of claim 33, wherein the request indicates a carrier frequency used by the access terminal.

36. The method of claim 33, wherein the request indicates how to respond to the request.

37. The method of claim 33, wherein the request indicates an uplink spreading code used by the access terminal.

38. The method of claim 33, further comprising receiving a handoff request in response to the network node determining that the candidate access point transmitted the at least one pilot signal received at the access terminal.

39. The method of claim 33, wherein the candidate access point comprises a femto node or a pico node.

40. The method of claim 33, further comprising receiving a handoff request that comprises a hand-in from a macro access point to the candidate access point in response to the network node determining that the candidate access point transmitted the at least one pilot signal received at the access terminal.

41. The method of claim 33, wherein the candidate access point is restricted to not provide, for at least one other access terminal, at least one of signaling, data access, registration, or service.

42. An apparatus for communication, comprising:

means for receiving, at a candidate access point, a request to the candidate access point monitor uplink signals from an access terminal based on parameters in the request, wherein the candidate access point comprises one of a plurality of neighbors of a source access point that were identified by a network node based on a report that the access terminal provided to the source access point and that the source access point forwarded to the network node and further based on the candidate access point transmitting pilot signals having the same pseudorandom number (PN) sequence phase offset as at least one pilot signal received at the access terminal, wherein the access terminal received the at least one pilot signal from one of the plurality of neighbors of the source access point, and wherein the report provided by the access terminal comprises a received signal strength value for each pilot signal received at the access terminal, a PN sequence phase offset of all pilot signals received at the access terminal, and a PN sequence phase offset of the access terminal;

means for monitoring, at the candidate access point, the uplink signals from the access terminal based on the parameters in the request; and means for transmitting a response to the request, wherein the response indicates a signal strength of the monitored uplink signals from the access terminal, and wherein the network node determines whether the candidate access point transmitted the at least one pilot signal received at the access terminal based on the response to the request.

43. The apparatus of claim 42, wherein:
the means for monitoring comprises means for decoding the uplink signals from the access terminal; and
the response further indicates that the candidate access point decoded the uplink signals from the access terminal.

44. The apparatus of claim 42, wherein the request indicates a carrier frequency used by the access terminal.

45. The apparatus of claim 42, wherein the request indicates how to respond to the request.

46. The apparatus of claim 42, wherein the request indicates an uplink spreading code used by the access terminal.

47. The apparatus of claim 42, wherein the means for receiving is configured to receive a handoff request in response to the network node determining that the candidate access point transmitted the at least one pilot signal received at the access terminal.

48. The apparatus of claim 42, wherein the candidate access point comprises a femto node or a pico node.

49. The apparatus of claim 42, further comprising receiving a handoff request that comprises a hand-in from a macro access point to the candidate access point in response to the network node determining that the candidate access point transmitted the at least one pilot signal received at the access terminal.

50. The apparatus of claim 42, wherein the candidate access point is restricted to not provide, for at least one other access terminal, at least one of signaling, data access, registration, or service.

51. An apparatus for communication, comprising:
an acquisition request processor configured to receive, at a candidate access point, a request to the candidate access point to monitor uplink signals from an access terminal based on parameters in the request, wherein the candidate access point comprises one of a plurality of neighbors of a source access point that were identified by a network node based on a report that the access terminal provided to the source access point and that the source access point forwarded to the network node and further based on the candidate access point transmitting pilot signals having the same pseudorandom number (PN) sequence phase offset as at least one pilot signal received at the access terminal, wherein the access terminal received the at least one pilot signal from one of the plurality of neighbors of the source access point, and wherein the report provided by the access terminal comprises a received signal strength value for each pilot signal received at the access terminal, a PN sequence phase offset of all pilot signals received at the access terminal, and a PN sequence phase offset of the access terminal;

a signal processor configured to monitor, at the candidate access point, the uplink signals from the access terminal based on the parameters in the request; and a response generator configured to transmit a response to the request, wherein the response indicates a signal strength of the monitored uplink signals from the access terminal, and wherein the network node determines whether the candidate access point transmitted the at least one pilot signal received at the access terminal based on the response to the request.

52. The apparatus of claim 51, wherein:
the signal processor is further configured to decode the uplink signals from the access terminal; and
the response further indicates that the candidate access point decoded the uplink signals from the access terminal.

53. The apparatus of claim 51, wherein the request indicates at least one of an uplink spreading code used by the access terminal, a carrier frequency used by the access terminal, or how to respond to the request.

54. The apparatus of claim 51, further comprising a handoff controller configured to receive a handoff request in response to the network node determining that the candidate access point transmitted the at least one pilot signal received at the access terminal.

55. A non-transitory
computer-readable medium comprising codes for causing a computer to:
receive, at a candidate access point, a request to the candidate access point to monitor uplink signals from an access terminal based on parameters in the request, wherein the candidate access point comprises one of a plurality of neighbors of a source access point that were identified by a network node based on a report that the access terminal provided to the source access point and that the source access point forwarded to the network node and further based on the candidate access point transmitting pilot signals having the same pseudorandom number (PN) sequence phase offset as at least one pilot signal received at the access terminal, wherein the access terminal received the at least one pilot signal from one of the plurality of neighbors of the source access point, and wherein the report provided by the access terminal comprises a received signal strength value for each pilot signal received at the access terminal, a PN sequence phase offset of all pilot signals received at the access terminal, and a PN sequence phase offset of the access terminal;

monitor, at the candidate access point, the uplink signals from the access terminal based on the parameters in the request; and transmit a response to the request, wherein the response indicates a signal strength of the monitored uplink signals from the access terminal, and wherein the network node determines whether the candidate access point transmitted the at least one pilot signal received at the access terminal based on the response to the request.

56. The non-transitory computer-readable medium of claim 55, wherein:
the codes for causing the computer to monitor the uplink signals from the access terminal comprises codes for causing the computer to decode the uplink signals from the access terminal; and the response further indicates that the candidate access point decoded the uplink signals from the access terminal.

57. The non-transitory computer-readable medium of claim 55, wherein the request indicates at least one of an uplink spreading code used by the access terminal, a carrier frequency used by the access terminal, or how to respond to the request.

* * * * *